United States Patent [19]

Cox

[11] Patent Number: 5,029,219

[45] Date of Patent: Jul. 2, 1991

[54] PERSONAL HANDWRITING VERIFICATION

[75] Inventor: Peter E. Cox, Derby, England

[73] Assignee: Rolls-Royce plc, London, England

[21] Appl. No.: 726,317

[22] Filed: Apr. 23, 1985

[30] Foreign Application Priority Data

Jun. 7, 1984 [GB] United Kingdom ............... 8414511

[51] Int. Cl.$^5$ ............................................... G06K 9/20
[52] U.S. Cl. ........................................ 382/3; 73/587;
73/865.4; 340/825.34; 382/59
[58] Field of Search ............................... 382/3, 58, 59;
340/825.34; 73/432 KS, 587, 865.4

[56] References Cited

U.S. PATENT DOCUMENTS

| 3,955,178 | 5/1976 | Warfel | 382/3 |
| 4,122,435 | 10/1978 | Greenaway | 382/3 |

FOREIGN PATENT DOCUMENTS

| 2310597 | 12/1976 | France . |
| 2438330 | 4/1980 | France . |
| 1227643 | 6/1986 | United Kingdom . |
| 1239842 | 6/1986 | United Kingdom . |
| 1286332 | 6/1986 | United Kingdom . |
| 1303441 | 6/1986 | United Kingdom . |
| 1400374 | 6/1986 | United Kingdom . |
| 2032669A | 6/1986 | United Kingdom . |

OTHER PUBLICATIONS

IBM Technical Disclosure Bulletin, vol. 18, No. 7, Dec. 1975, "Speed Pen", Darringer et al.
Electronics, vol. 44, No. 18, Aug. 30, 1971, "Software", pp. 26, 28.

Primary Examiner—Leo H. Boudreau
Attorney, Agent, or Firm—Cushman, Darby & Cushman

[57] ABSTRACT

The stress-wave activity produced by the interaction between a writing instrument and a surface during the generation of a given piece of handwriting on the surface is detected and stored. The stress-wave activity produced by a subsequent generation of the given piece of handwriting is then compared with that produced by the initial piece of handwriting in order to determine whether the initial and subsequent handwriting pieces have a common author.

3 Claims, 1 Drawing Sheet

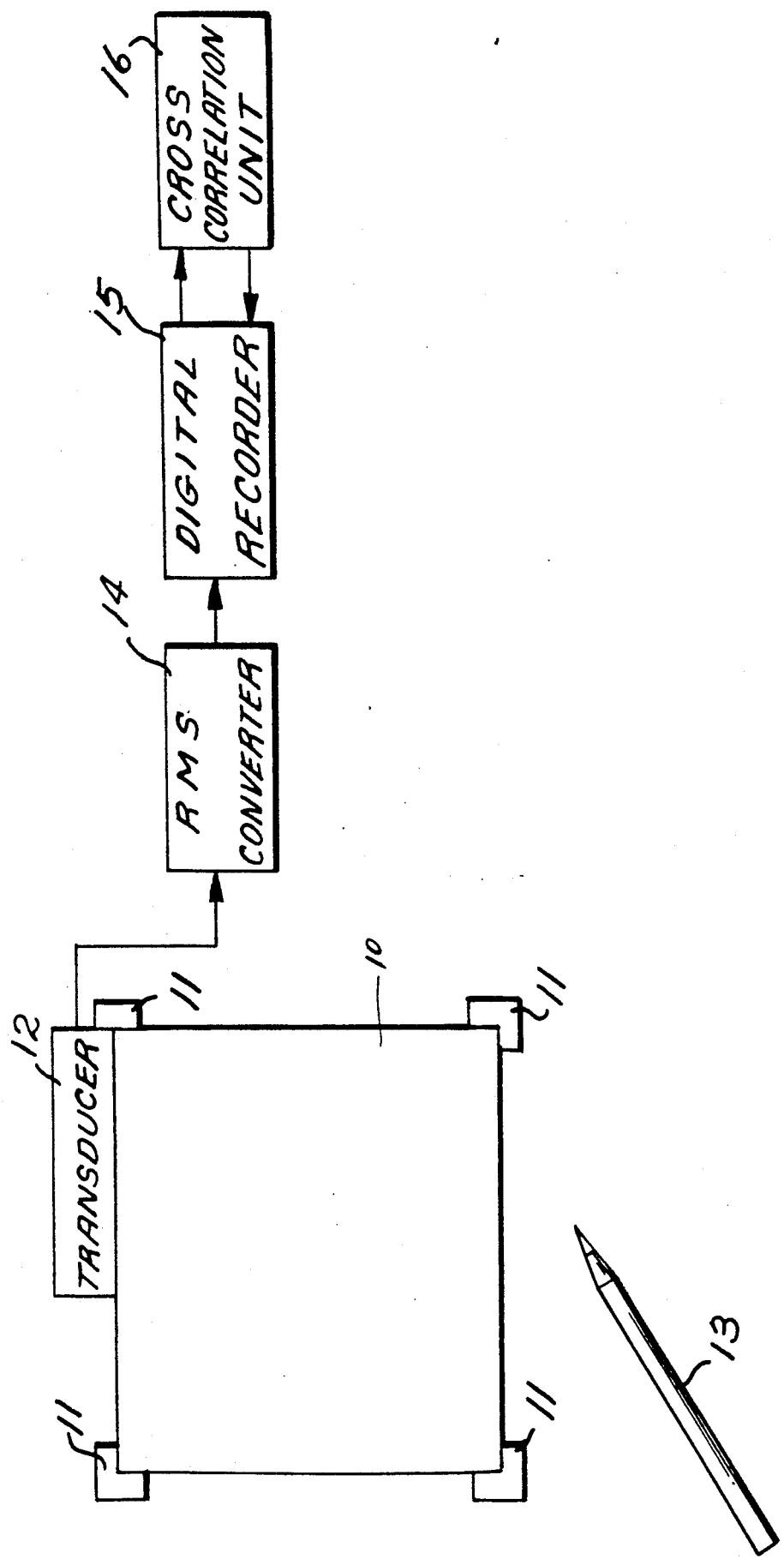

PERSONAL HANDWRITING VERIFICATION

BACKGROUND OF THE INVENTION

This invention relates to a device and method for verifying personal handwriting.

It is known to provide a device for verifying personal handwriting which relies on the coordinate comparison of, for instance, a signature, with an authentic signature in order to determine whether the compared signature is itself authentic. However, since such devices rely on the use of quite elaborate software and writing recognition systems, they tend to be complicated and expensive. Moreover they are not completely effective in the detection of good forgeries in view of the often very close visual similarity between a forged signature and one which is authentic.

It is an object of the present invention to provide a device for and method of verifying personal handwriting which does not rely on the coordinate comparison of handwriting pieces and which has a high level of immunity to forgeries.

SHORT STATEMENT OF THE INVENTION

According to the present invention, a device for verifying personal handwriting comprises means for monitoring the stress-wave activity in a given body produced by the motion of a given writing instrument on a given surface of that body during the generation of a given piece of handwriting, means for storing said stress wave activity and means for comparing said stored stress-wave activity with the stress-wave activity produced by the motion of a like writing instrument on a like surface of a like body during the generation of a subsequent like piece of handwriting to provide an indication of whether the generation of said handwriting pieces produce substantially common stress wave activity and thus whether the pieces have been generated by a common author.

According to a further aspect of the present invention, a method of verifying personal handwriting comprises monitoring the stress-wave activity in a given body produced by the motion of a given writing instrument on a given surface at that body during the generation of a given piece of handwriting, storing said stress-wave activity and comparing said stored stress-wave activity with the stress wave activity produced by the motion of a like writing instrument on a like surface of a like body during the generation of a subsequent sample of a like piece of handwriting to provide an indication of whether the generation of said handwriting pieces produce substantially common stress wave activity and thus whether the pieces have been generated by a common author.

BRIEF DESCRIPTION OF THE DRAWING

The invention will now be described, by way of example, with reference to the accompanying drawing which is a block diagram of a device in accordance with the present invention.

DETAILED DESCRIPTION OF THE PREFERRED EMBODIMENTS

With reference to the drawing, a steel plate 10 is mounted on rubber blocks 11 in order to acoustically isolate it from the surface upon which it is located. A conventional resonant acoustic emmission transducer 12 is attached to the plate 10 for the purpose of detecting stress-wave activity associated with the plate 10. Such stress-wave activity is produced by the generation of a piece of handwriting on a surface of the plate 10 using a pencil 13. A piece of paper or other similarly surfaced material may be present on the steel plate to receive the handwriting piece or alternatively the piece may be written directly on the steel plate 10. Moreover, the piece of handwriting may be generated by an alternative writing instrument if so desired. For instance, if it is not desired to produce a visible record of the handwriting piece, the writing instrument may be in the form of a stylus. The only essential requirement for the writing instrument and writing surface is that when the handwriting piece is generated, the friction between them should be sufficient to produce detectable stress-waves within the steel plate 10.

As the handwriting piece is generated on the steel plate 10 by the use of the pencil 13, the resultant stress-wave activity is detected by the transducer 12. The transducer 12 does not detect the total stress-wave activity within plate 10. Instead it only detects the stress-wave activity over a narrow band of frequencies. The band chosen is one which is efficiently transmitted within the steel plate 10 but which is quickly damped out by air and the rubber material on which the plate 10 is mounted. The object is to ensure that it is substantially only stress-wave activity produced by the interaction of the pencil 13 and steel plate 10 which is detected by the transducer 12. We have found that a band of frequencies around 100 KHz is sufficient for these purposes.

The transducer 12 essentially produces an amplitude modulated, single frequency output voltage which is in accordance with the detected stress-wave activity. This signal is fed to a root mean square converter 14 which serves to simplify the signal, demodulating it to an envelope of the acoustic activity associated with the generation of the handwriting piece. The bandwidth, dynamic range and duration of this envelope are suitably limited to those values which are relevant to and characteristic of the particular handwriting piece under investigation.

The output of the root mean square converter 14 is fed to a digital recorder 15 which serves to store that output as one which is characteristic of the stress-wave activity produced by the generation of the handwriting piece.

If it is assumed that the root mean square converter 14 output stored within the digital recorder 15 is representative of an authentic handwriting piece, the device of the present invention can then be used to determine whether a subsequent piece of the same piece of handwriting is also authentic or is a forgery i.e. whether the samples have a common author. Thus the subsequent piece of handwriting is generated on the same surface of the steel plate 10 using the same pencil 13. The stress-wave activity produced by the subsequent handwriting piece is processed by the root mean square converter 14 in the same manner as the initial handwriting piece before being passed to the digital recorder 15. The digital recorder 15 outputs signals which are representative of the initial and subsequent handwriting pieces to a cross-correlation unit 16 which compares the signals and gives an indication of the degree of conformity between them.

It will be appreciated that in order to facilitate the comparison of the stress-wave activities of the two pieces of handwriting, those handwriting pieces should be generated by like instruments on like surfaces of like bodies. Thus the second handwriting pieces may be generated on the same surface of the same plate 10 using the same pencil 13 or alteratively using an identical surface, body and instrument.

It will also be appreciated that even if both handwriting pieces have a common author, there is likely to be a certain degree of disconformity between them and this can be allowed for by the cross-correlating unit 16. However the factor which is likely to have the most effect on disconformity is time. This being so, we prefer that the root mean square converter 14 is provided with suitable means for restricted adjustment of its output with respect to the duration of the subsequent handwriting piece so that similar handwriting pieces can be examined within an equal time period. Such a time variation could be achieved by digitizing the signal relating to the subsequent handwriting piece at a high sampling rate so as to record an excessive amount of information, and then selecting the desired number of regularly disposed information extracts for the purpose of comparison. Digitizing may be achieved using a transient event recorder set for "pre-trigger" so that the act of putting the pencil 13 on the steel plate 10 triggers the recording sequence.

Thus if a certain degree of disconformity between the signals arising from the generation of two handwriting pieces is allowed for, the device of the present invention differentiates between authentic and forged examples of a given piece of handwriting.

In tests using the device of the present invention, attempts were made using the pencil 13 and steel plate 10 to forge a signature which had been recorded by the digital recorder 15. While these tests produced signatures which were visually very similar to the authentic signature, the cross-correlation unit 16 indicated that there was very little conformity between the authentic and forged signatures. Moreover further tests have indicated that the device of the present invention exhibits a high level of consistency in the results which it provides.

The present invention therefore provides a device and method which are capable of distinguishing between authentic and forged pieces of a given piece of personal handwriting which relies on characteristics of the handwriting not directly linked with its visual appearance. This being so, the task of a forger in the production of a counterfeit version of the handwriting piece is a lot more difficult than is the case with the production of a version which is judged only from a visual point of view. Moreover, even if a forger were to obtain a copy of the stress-wave activity associated with a given piece of handwriting, the duplication of that stress-wave activity would prove to be extremely difficult if not impossible.

As stated earlier, the device of the present invention may be used to produce a visual version of a given piece of handwriting only if it is desired to do so. Thus it may be desirable to produce a visual version of the handwriting as an additional security measure so that the handwriting can also be examined by conventional coordinate verification systems. Alternatively it may be desirable to produce a non-visible version of a given handwriting piece if the particular piece of handwriting is in the form of a secret word or collection of words. Again this would be an additional security measure since any would-be forger would have to discover the secret word of words as well as the stress-wave activity associated with the writing thereof.

In the event that a visual version of the piece of handwriting is required, it will be understood that the term "body" as used herein is intended to embrace both the body which has the transducer associated with it and the paper or other suitable material which is located upon the body for the reception of the handwriting piece.

The amount of software necessary for the cross-correlation unit 16 to perform effectively is small compared with that associated with conventional coordinate handwriting recognition systems. This being so, personal handwriting recognition devices in accordance with the present invention are comparatively cheap and simple, thereby opening up the possibility of its widespread application. Indeed, the cross-correlation unit 16 could rely on comparatively cheap electronic hardware devices, such as charge-coupled devices, which can perform correlation "calculations" very quickly instead of through the use of software.

I claim:

1. A device for verifying personal handwriting comprising:
a given body, a given writing instrument, means for monitoring the stress-wave activity in said body produced by the motion of said given writing instrument on a given planar surface of said given body during the generation of a given piece of handwriting and generating an output signal representative of the stress-wave activity, storage means for storing said signal representative of the stress-wave activity and comparison means for comparing said signal representative of the stored stress-wave activity with the signal representative of the stress-wave activity produced by the motion of a like writing instrument on a like surface of a like body during the generation of a subsequent like piece of handwriting to provide an indication of whether the generation of such handwriting pieces produce substantially common stress-activity and thus whether the pieces have been generated by a common author, said means for monitoring comprising a resonant acoustic emission transducer having means for detecting only frequencies in the vicinity of 100 KHz.

2. A device as claimed in claim 1 wherein said writing instrument and said surface are selected such that said generated handwriting pieces are a visual representation thereof.

3. A device as claimed in claim 1 wherein said means are provided to vary over a restricted range, the duration of the stress-wave activity produced by the generation of said subsequent like piece of handwriting to facilitate the matching of the duration thereof with the duration of the stress-wave activity produced by the generation of said first piece of said handwriting.

* * * * *